US006157596A

United States Patent [19]

Matsui

[11] Patent Number: 6,157,596

[45] Date of Patent: Dec. 5, 2000

[54] METHOD FOR ERASING REWRITABLE OPTICAL DISK USING TWO LASER BEAMS

[75] Inventor: Tsutomu Matsui, Tokyo, Japan

[73] Assignee: NEC Corporation, Tokyo, Japan

[21] Appl. No.: 08/955,281

[22] Filed: Oct. 21, 1997

Related U.S. Application Data

[60] Continuation of application No. 08/769,877, Dec. 19, 1996, abandoned, which is a division of application No. 08/558, 160, Nov. 15, 1995, Pat. No. 5,621,707.

[30] Foreign Application Priority Data

Nov. 16, 1994 [JP] Japan .................................... 6-282046
Dec. 28, 1994 [JP] Japan .................................... 6-328880

[51] Int. Cl.[7] .................................................... G11B 13/00

[52] U.S. Cl. ............................................... 369/14; 369/102

[58] Field of Search ................................. 369/14, 13, 32, 369/44.37, 44.38, 44.39, 109, 275.1, 275.2, 275.5, 102

[56] References Cited

U.S. PATENT DOCUMENTS

| | | | |
|---|---|---|---|
| 4,972,396 | 11/1990 | Rafner | 369/32 |
| 4,980,879 | 12/1990 | Yamada et al. | 369/100 |
| 4,998,238 | 3/1991 | Mizunoe et al. | 369/116 |
| 5,276,674 | 1/1994 | Tanaka | 369/275.5 |
| 5,333,124 | 7/1994 | Kikuchi et al. | 369/13 |
| 5,394,381 | 2/1995 | Fukumoto et al. | 369/13 |

FOREIGN PATENT DOCUMENTS

| | | |
|---|---|---|
| 0273384 | 7/1988 | European Pat. Off. . |
| 62-92293 | 4/1987 | Japan . |
| 62-141601 | 6/1987 | Japan . |
| 63-58625 | 3/1988 | Japan . |
| 01122033 | 5/1989 | Japan . |
| 02230537 | 9/1990 | Japan . |

*Primary Examiner*—Tan Dinh
*Attorney, Agent, or Firm*—Sughrue, Mion, Zinn, Macpeak & Seas, PLLC

[57] ABSTRACT

An optical disk apparatus of the present invention forms, in a first embodiment, two laser beams for erasure of data and irradiates the two laser beams from a single erasing head 102 so that focuses 207 and 208 thereof may be disposed on a same track of an optical disk 206. In order to construct the erasure head so as to provide two beams, either a two beam semiconductor laser 201 may be used or a beam from a semiconductor laser 215 may be divided into two beams. For the means for dividing the beam into two beams, a Wollaston polarizing prism 216, a Bragg diffraction grating 218, a Foucault prism 219 or some other suitable element can be used. Meanwhile, in a second embodiment, data are reproduced by an optical equivalence method using an optical disk 82, 100 or 206 of a phase change medium which exhibits a phase difference smaller than 180 degrees in reflected light therefrom based on recorded data. The phase difference preferably ranges from 120 degrees to 150 degrees. The phase difference can be made smaller than 180 degrees by adjusting the thickness of a protective film 12 on the light incidence side of the optical disk with respect to a phase change film 13.

10 Claims, 6 Drawing Sheets

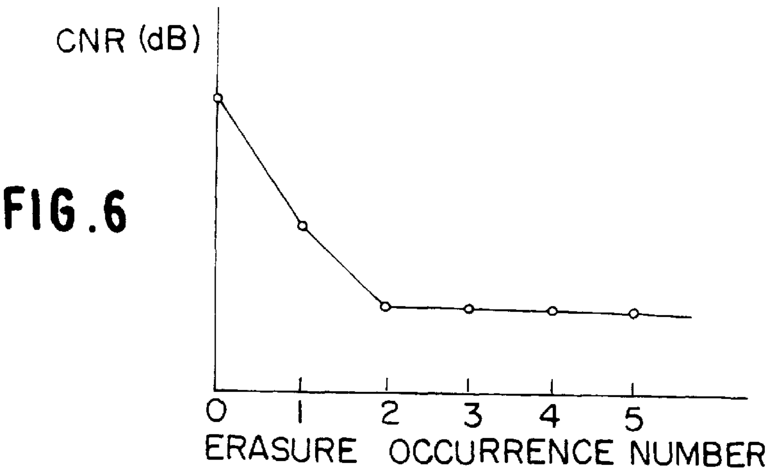
FIG.6
FIG.7
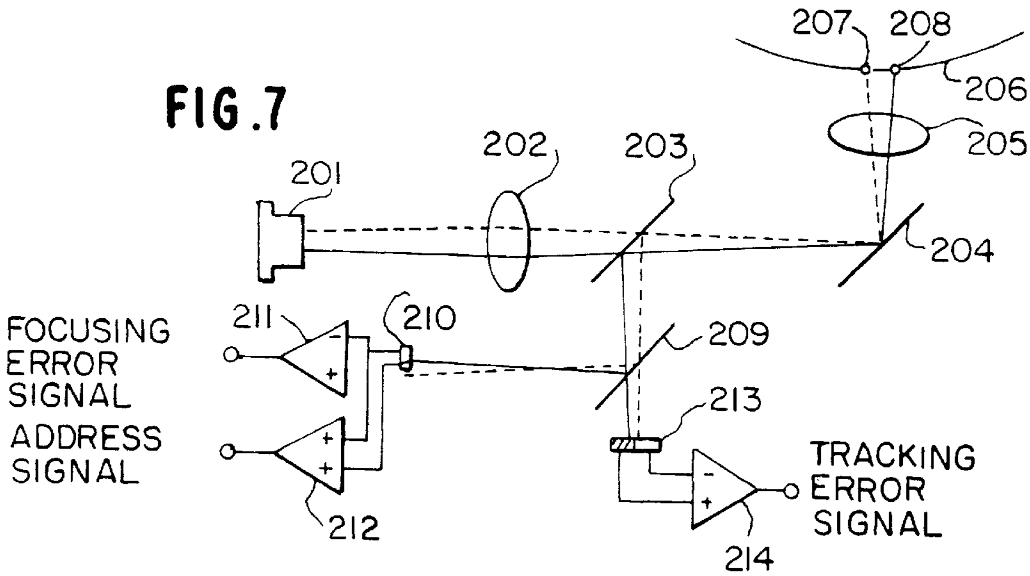
FIG.8
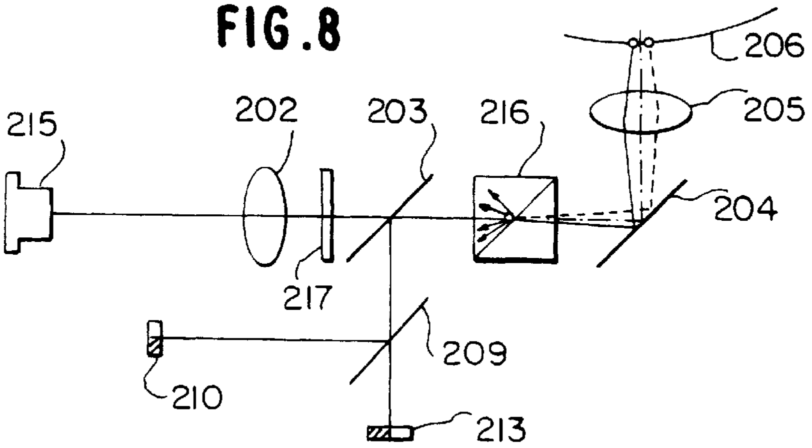

FIG. 9
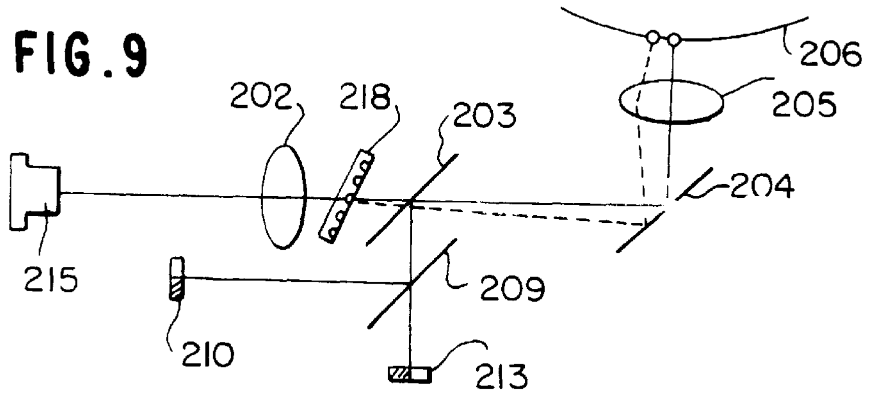
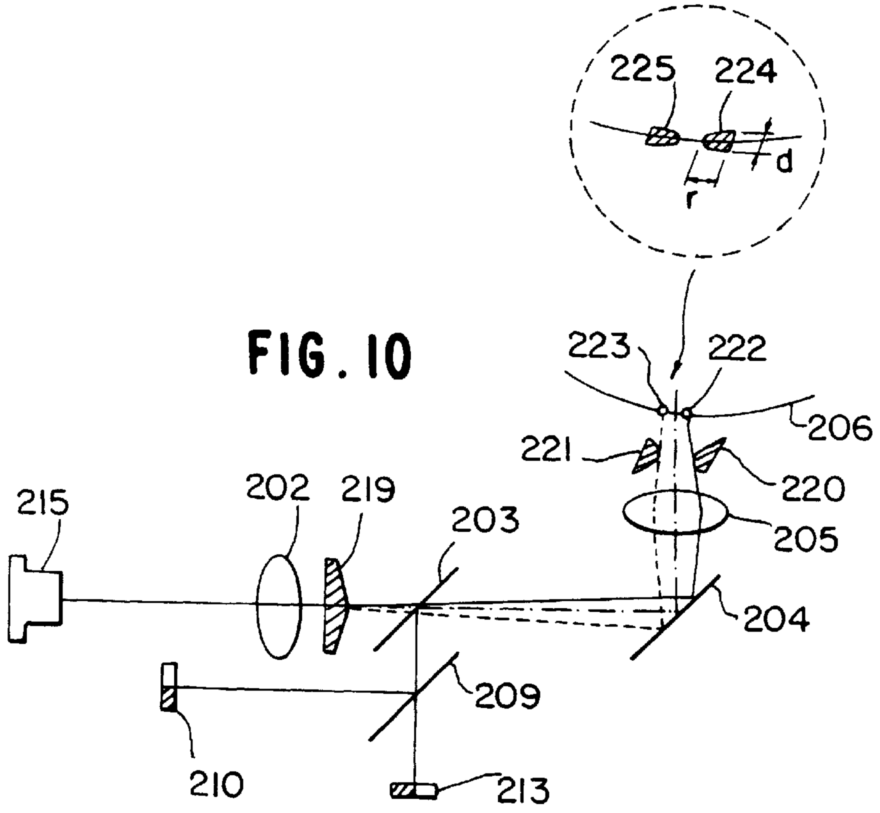
FIG. 10
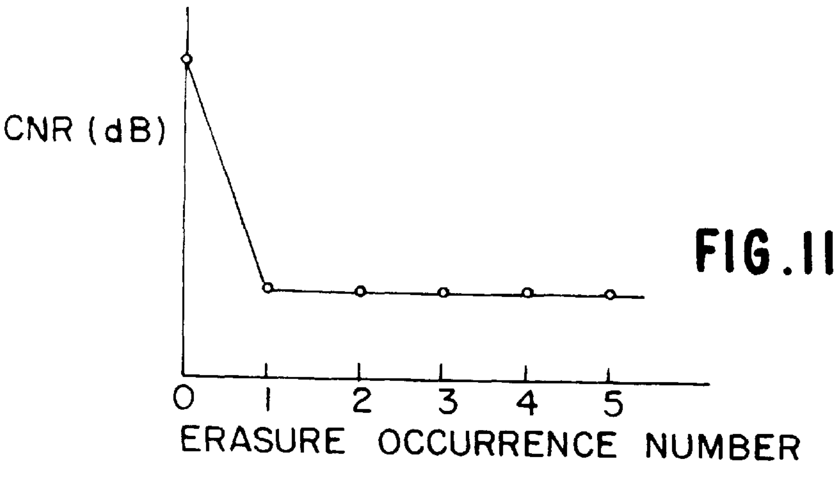
FIG. 11

METHOD FOR ERASING REWRITABLE OPTICAL DISK USING TWO LASER BEAMS

This is a Continuation of Application No. 08/769,877 filed on Dec. 19, 1996, which is a Divisional of Application No. 08/558,160 filed on Nov. 15, 1995 now U.S. Pat. No. 5,621,707.

BACKGROUND OF THE INVENTION

1. Field of the Invention

This invention relates to a record rewritable optical disk apparatus of the phase difference type, and more particularly to an erasing optical head for use with a record rewritable phase difference optical disk apparatus and a recording and reproduction method by an optical equivalence method.

An optical disk apparatus is a storage apparatus of the contactless type which records information in a high density onto an optical disk and reproduces the information at a high speed using a laser beam, and is being investigated and developed as an external storage apparatus for an information processing system which has both of a high speed accessing property of a magnetic disk apparatus and a large storage capacity of an optical disk. It is forecasted that an optical disk apparatus which has high transfer rate and large memory capacity will be used for all disk storage apparatus for use with a high definition television (HDTV) system of the next generation.

Some optical disk apparatus are constructed only for reproduction of a record stored an optical disk, and some other optical disk apparatus are constructed so that they can rewrite a record of an optical disk. The present invention principally relates to an optical disk apparatus of the phase difference type which uses a record rewritable phase change medium.

2. Description of the Related Art

An optical disk for the phase difference type is constructed so as to provide a phase difference between the phase for reflected light from a "mark" portion of information and the phase for reflected light from a "blank" portion of the information. As shown in a partial sectional view of FIG. 1, an optical disk of the phase difference type includes a base plate 11 in the form of a transparent disk of polycarbonate, a first protective film 12 in the form for a composite film (ZnS—SiO2) of zinc sulfide and silicon dioxide, a recording film for a phase change medium 13 of a three element type with germanium-antimony-tellurium (GeSbTe) or the like, a second protective film 14 of Zn—SiO2, and a reflection film 15 of aluminum (Al) or silicon (Si). The first protective film 12, the phase change medium 13, the second protective film 14 and the reflection film 15 are formed in this order on the base plate 11. Writing or erasure for information onto or from a rewritable optical disk is performed by changing the condition of the phase change medium 13 between a crystal condition and a non-crystal condition, and a portion in a non-crystal condition is recorded as a mark 16. The phase difference between reflected waves from a mark and a blank is normally set to approximately 180 degrees so as to assure a high resolution.

Light irradiated from an objective lens 75 is introduced into the optical disk from the base plate 11 side, passes through the first protective film 12, the phase change medium 13 and the second protective film 14 and is reflected by the reflection film 15. The reflected light reversely follows the same route and is introduced into the objective lens 75 again. The incident light to the objective lens 75 exhibits a phase difference between a component thereof which has passed through a portion in a non-crystal condition of the phase change medium 13 representing a mark and another component thereof which has passed through another portion in a crystal condition of the phase change medium 13 which represents any other than a mark.

An optical equivalence method is one of data reproduction methods for an optical disk disclosed, for example, in Japanese Patent Laid-Open Application No. 60-23932 (1985) or No. 63-58625 (1988). According to the optical equivalence method, an optical disk on which information is recorded is scanned by a laser beam irradiated from an optical head, and reflected light from the optical disk is detected by an optical sensor which is divided at least into two portions of a front half portion and a rear half portion in the scanning direction. The output of the front half portion of the optical sensor is delayed and added to the output of the rear half portion of the optical sensor to reproduce a signal corresponding to the information recorded on the optical disk.

An example of a construction typical of the conventional optical heads used for the optical equivalence method is shown in FIG. 2. Referring to FIG. 2, the optical head shown includes a laser light source 71 of a wavelength λ, a collimator lens 72, a polarizing beam splitter 73, λ/4 plate 74 of the quarter wavelength, an objective lens 75, a convergent lens 76, an optical sensor 77 having four divisional portions or at least two divisional portions, a pair of amplifiers 78 and 79, a delay unit 80, and an adder 81. It is to be noted that, although an actual apparatus includes, in addition to the components mentioned above, a circuit for rotational control of an optical disk, a servo circuit for positioning the optical head and other necessary circuits, they are omitted in FIG. 2.

Light from the laser light source 71 is converted into parallel light by the collimator lens 72, passes through the polarizing beam splitter 73 and is converted into circularly polarized light by the λ/4 plate 74. Then, the circularly polarized light is converged by the objective lens 75 and irradiated as a convergent beam spot upon an optical disk 82. Reflected light from the optical disk 82 is introduced through the objective lens 75 and the λ/4 plate 74 into the polarizing beam splitter 73, by which it is deflected by 90 degrees. The light from the polarizing beam splitter 73 is converged by the convergent lens 76 and introduced into the optical sensor 77.

The optical sensor 77 has at least two divisional optical detection portions, which correspond to a front half F and a rear half R of the convergent beam spot, which advances as the optical disk 82 rotates, in the advancing direction of the convergent beam spot. As the optical disk 82 rotates, that is, as the convergent beam spot advances, the optical sensor 77 outputs detected signals from the front and rear detection portions F and R thereof. The two output signals are amplified by the amplifiers 78 and 79, respectively, and after the output signal of the amplifier 78 is delayed by the delay unit 80 in accordance with the necessity, the two signals are inputted to and added by the adder 81. An RF signal (Radio Frequency signal) for the addition is outputted as a reproduction signal of the stored information of the optical disk 82.

When a reproduction RF signal is obtained by the apparatus described above, the correspondence between the relative positional relationship between a light beam spot on the surface of a medium and a pit representing a mark and a diffraction image at an aperture portion of the objective lens 75 or on a light reception surface for the optical sensor 77 is such as shown in FIG. 3. In particular, when a leading end of a mark 32 advances into a light beam spot 31 as seen in FIG. 3(*a*) and when only a trailing end of the mark 32 remains in the light beam spot 31 as seen in FIG. 3(*c*), a small image is produced at a central portion of the optical sensor 77 as seen in (d) and (f). But when the center of the light beam spot 31 and the center of the mark 32 are aligned with each other as seen in FIG. 3(*b*), a diffraction image is produced over the entire area of the optical sensor 77 as seen in FIG. 3(*e*). As can be seen apparently from FIG. 3, at whichever position the mark 32 is in the light beam spot 31, the diffraction image of the mark 32 is positioned at a central portion of the light reception sensor. In short, the outputs of the light reception sensor are quite the same between the front half side and the rear half side, and the outputs of the amplifiers 78 and 79 are such as shown in FIG. 4.

An optical disk apparatus which can record, reproduce and erase information includes, as shown in FIG. 5 three optical heads including an erasing head 102, a recording and reproducing head 103 and a reproducing head 104 which are disposed on a track of a same circumference along a direction 101 of rotation of an optical disk 100. The optical heads 102, 103 and 104 irradiate single laser light from a semiconductor laser as a beam upon a track of the optical disk, read an address written on the optical disk in an applied condition of tracking servo and erasure, writing and reproduction of a record for the same track.

In order to realize an optical disk apparatus of a high transfer rate and a large memory capacity, it is required to minimize the diameter of the convergent beam and raise the erasure rate of the erasable optical disk. Further, where the optical disk is an optical disk of a phase change medium or the like onto and from which information can be recorded, reproduced and erased, the erasure rate must be set high in order to achieve a high carrier to noise ratio (CNR).

The CNR of a reproduction signal can be raised by increasing the contrast based on the difference in reflection factor between a crystal condition and a non-crystal condition (amorphous) of a phase change medium, that is, by increasing the optical-medium modulation degree. Further, in the optical disk of the phase change type, the optimum erasing power is intermediate between the optimum recording power and the optimum reproduction power.

An erasure occurrence number to CNR characteristic of the phase change optical disk described above at a high speed is illustrated in FIG. 6. Referring to FIG. 6, the axis of abscissa indicates the erasure occurrence number, and the axis of ordinate indicates the CNR characteristic. From FIG. 6, it can be seen that a single erasing operation cannot sufficiently erase a record and two or more erasing operations are required to erase a record into a substantially saturated condition.

With the phase change optical disk, since the CNR characteristic by recording and reproduction cannot be extracted sufficiently by a single erasing operation by which sufficient erasure cannot be achieved as described above, a total storage modulation degree by an optical disk and an optical head which is most important to achieve high density recording, that is, the product between the medium modulation degree and the optical modulation degree, cannot be increased sufficiently. Accordingly, high density recording cannot be realized.

SUMMARY OF THE INVENTION

It is an object of the present invention to provide an optical disk apparatus of the phase difference type wherein the erasure rate of an erasing optical head is increased and the resolution upon recording and reproduction of an optical equivalence method is improved so that the CNR can be raised and the recording density of an optical disk can be improved.

In order to attain the object described above, an optical disk apparatus of the present invention forms, in a first embodiment, two laser beams for erasure of data and irradiates the two laser beams from a single erasing head so that focuses thereof may be disposed on the same track of an optical disk.

In order to construct the erasing head so as to provide two beams, either a two beam semiconductor laser may be used or a beam from a semiconductor laser may be divided into two beams. For the means for dividing the beam into two beams, a Wollaston polarizing prism, a Bragg diffraction grating, a Foucault prism or some other suitable element can be used.

Meanwhile, in the second embodiment, the optical disk apparatus comprises an optical disk of a phase change medium which exhibits a phase difference smaller than 180 degrees in reflected light therefrom based on recorded information.

Preferably, the phase difference ranges from 120 degrees to 150 degrees.

Where the optical disk is a phase difference medium of a phase change film wherein recording of information is based on a variation between an amorphous condition and a crystal condition, the phase difference is preferably controlled by adjusting the thickness of a protective film on the light incidence side of the optical disk with respect to the phase change film to a predetermined value.

The above and other objects, features, and advantages of the present invention will become apparent from the following description referring to the accompanying drawings which illustrate the examples of the preferred embodiments of the present invention.

BRIEF DESCRIPTION OF THE DRAWINGS

FIG. 6 is a diagram illustrating an erasure repetition occurrence number to CNR characteristic of a conventional optical disk apparatus;

FIG. 7 is a diagrammatic view showing a structure of an erasing head of a first embodiment of the present invention;

FIG. 8 is a diagrammatic view showing a structure of a second example of the erasing head of the present invention;

FIG. 9 is a diagrammatic view showing a structure of a third example of the erasing head of the present invention;

FIG. 10 is a diagrammatic view showing a structure of a fourth example of the erasing head of the present invention;

FIG. 11 is a diagram illustrating an erasure repetition occurrence number to CNR characteristic of an optical head of the present invention;

DETAILED DESCRIPTION OF THE PREFERRED EMBODIMENTS

Figure 1:
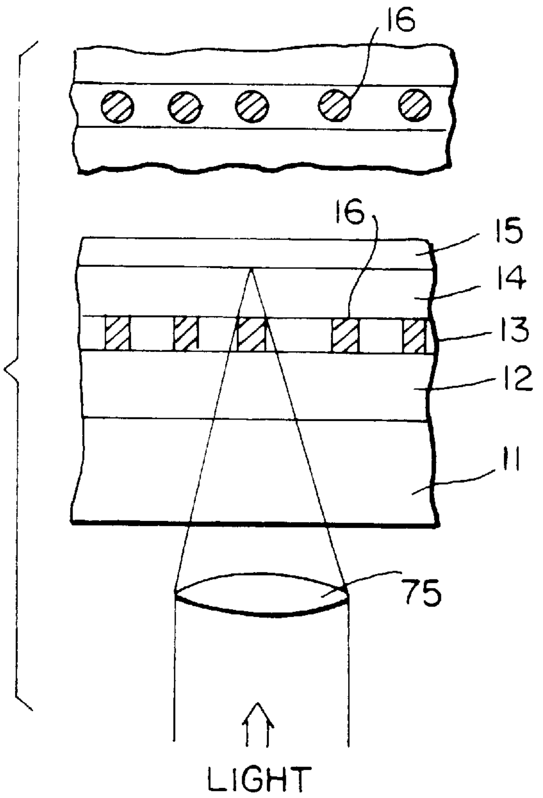
FIG. 1 is a partial sectional view of a conventional optical disk of the phase difference type of a phase change medium.
Figure 2:
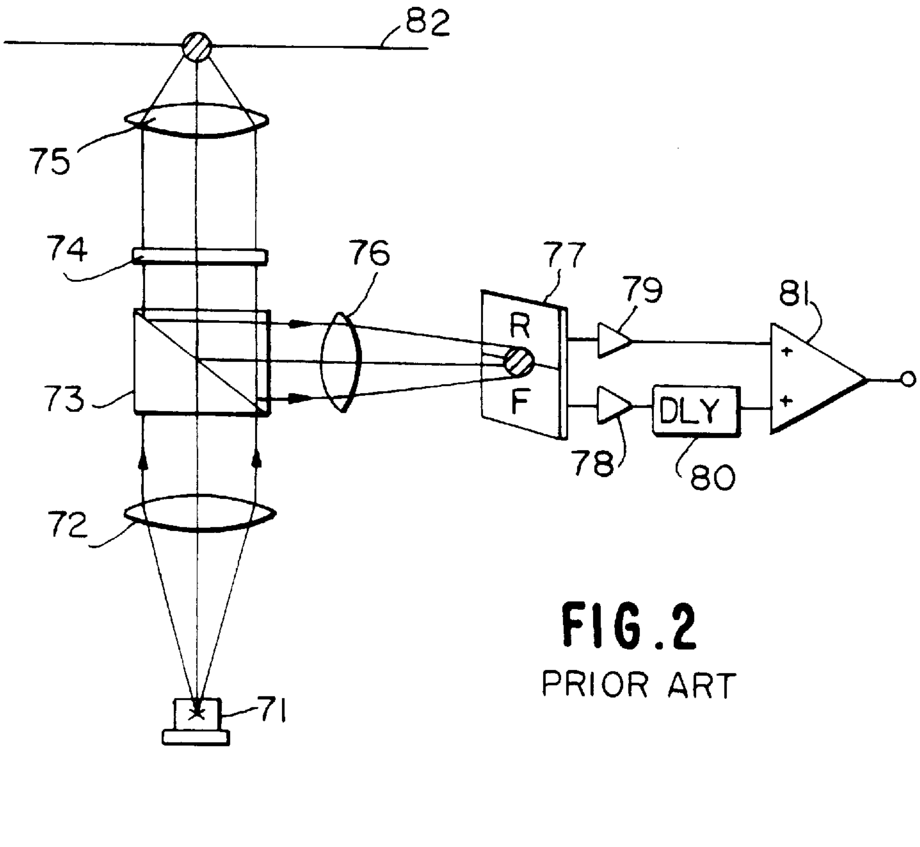
FIG. 2 is a schematic view showing a construction of a conventional optical head.
Figure 3:
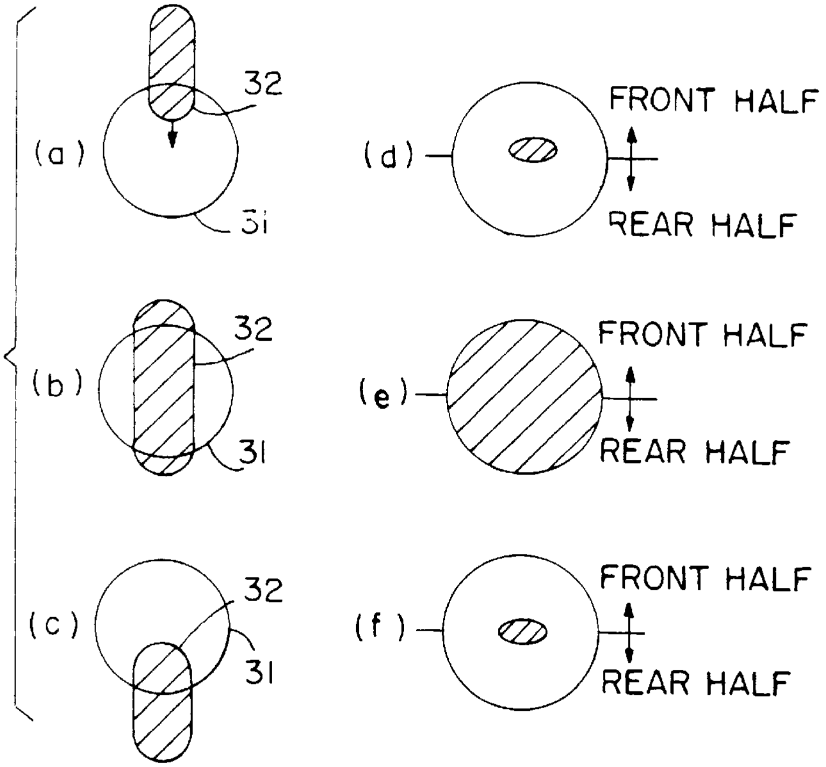
FIG. 3 is a diagrammatic view illustrating a variation of a diffraction image of a mark when a light beam spot moves in a conventional optical disk apparatus.
Figure 4:
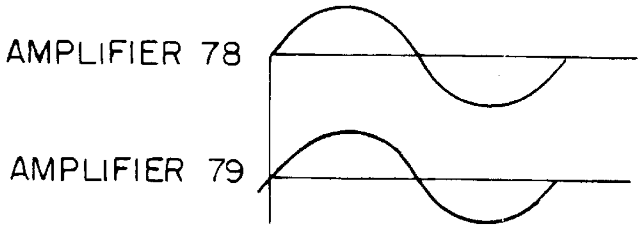
FIG. 4 is a diagram showing output waveforms of amplifiers 78 and 79 when the phase difference is 180 degrees.
Figure 5:
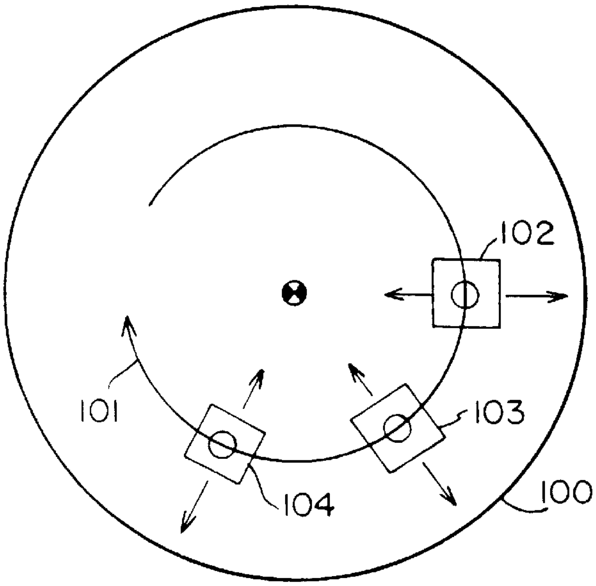
FIG. 5 is a schematic view showing an arrangement of optical heads.

Referring to FIG. 7, an erasing head of the first embodiment includes a two beam semiconductor laser 201 which outputs two beams toward an optical disk 206.

The outputs of the two beam semiconductor laser 201 are converted into parallel light by a collimator lens 202 and advances straightforwardly through a beam splitter 203, whereafter they are deflected by 90 degrees by a 45-degree mirror 204 and converged by an objective lens 205. Consequently, two beams 207 and 208 are landed on the optical disk 206. The beam splitter 203 may be of the optical isolator type which includes a polarizing beam splitter and a λ/4 plate not shown.

Reflected light from the optical disk 206 returns in the reverse order to the objective lens 205 and then to the 45-degree mirror 204 and is deflected by 90 degrees by the beam splitter 203. Then, the output light of the beam splitter 203 is introduced into a two or four divisional optical sensor 210 past a converging optical system not shown and a beam splitter 209. The outputs of the divisional optical sensor 210 are subtracted by a differential amplifier 211 to obtain a focusing error signal. Further, the outputs of the divisional optical sensor 210 are added by an adder 212 to detect a RF signal to thus detect a track address signal. Further, those beams which advance straight-forwardly through the beam splitter 209 are detected by a push-pull method by means of a two divisional optical sensor 213, and a tracking error signal is obtained from outputs of the two divisional optical sensor 213 by a differential amplifier 214.

FIGS. 8 to 10 show other examples of the erasing head. Those erasing heads employ a one beam laser but produce two beams at a light power ratio as near as possible to the ratio of 1:1. In FIGS. 8 to 10, same components to those of FIG. 7 are denoted by same reference numerals.

The erasing head of FIG. 8 includes a one beam semiconductor laser 215 and further includes a Wollaston polarizing prism 216 interposed between the beam splitter 203 and the 45-degree mirror 204. Either the Wollaston polarizing prism 216 is disposed such that the polarization axis of a linearly polarized light beam from the collimator lens 202 may make an angle of 45 degrees with respect to one side of the Wollaston polarizing prism 216 which has the shape of a cube or a half wavelength plate 217 is interposed between the beam splitter 203 and the Wollaston polarizing prism 216 so that the quantities of light of two beams produced by the Wollaston polarizing prism 216 may be equal to each other.

Returning reflected light of two beams from the optical disk 206 passes through the Wollaston polarizing prism 216, whereupon each of the two beams is divided into two beams. Consequently, a total of four beams are outputted from the Wollaston polarizing prism 216. The output beams are deflected by 90 degrees by the beam splitter 203 and further deflected by 90 degrees by a beam splitter 209, and one of the beams is detected by the two or four divisional optical sensor 210 to obtain a focusing error signal and a track address signal in a similar manner as in the example of FIG. 7. Meanwhile, the beams which advance straightforwardly through the beam splitter 209 are received by a push-pull method by means of the two divisional optical sensor 213 to obtain a tracking error signal.

The erasing head of FIG. 9 includes a Bragg diffraction grating 218 interposed between the collimator lens 202 and the beam splitter 203 in order to form two beams. The Bragg diffraction grating 218 does not have a cross section of a U-shaped groove shape but has a triangular cross section and exhibits a light quantity ratio approximately equal to 1:1 between two beams. The other construction of the erasing head of FIG. 9 is the same as that of FIG. 7.

The output of the one beam semiconductor laser 215 is converted into parallel light by the collimator lens 202 and divided into two beams by the diffraction grating 218. The two beams advance straightforwardly through the beam splitter 203 and are deflected by 90 degrees by the 45-degree mirror 204, whereafter they are converged by the objective lens 205 so that the two beams are landed on the optical disk 206.

Reflected light from the optical disk 206 passes through the objective lens 205 and the 45-degree mirror 204 in the reverse order and is then deflected by 90 degrees by the beam splitter 203, whereafter it is deflected by 90 degrees by the beam splitter 209 and then introduced into the two or four divisional optical sensor 210. The beams which pass straightforwardly through the beam splitter 209 are introduced into the two divisional optical sensor 213. Detection of a focusing error signal and detection of a track address signal and a tracking error signal are performed similarly to those performed with the erasing head in FIG. 7.

The erasing head in FIG. 10 includes a Foucault prism 219 interposed between the collimator lens 202 and the beam splitter 203 for dividing a circular collimator beam into two semicircular beams. While a Foucault prism of the convex type is employed as the Foucault prism 219 in the present example shown, another Foucault prism of the concave type may alternatively be employed. The other construction of the erasing head of FIG. 10 is the same as that of FIG. 7.

In FIG. 10, semicircular beams 220 and 221 divided by the Foucault prism 219 and being converged onto the optical 206 and two beams 222 and 223 converged on the optical disk 206 are shown. Further, patterns of converging beams of the two beams 222 and 223 are shown in an enlarged scale as 224 and 225, respectively. The length d of the dividing line for the two divided convergent beams 224 and 225 in their diametrical direction is short, but the length r extending in a perpendicular direction from the dividing line is long. Since the aperture number is ½, the aperture number is equivalently reduced, and the convergent beams have a shape whose aspect is reversed to that of those beams before they are converged (r>d). In FIG. 10, the major axis of the converging beams coincides with a tangential direction to the optical disk 206. Further, the ratio between the light power of the two beams is 1:1.

FIG. 11 illustrates a variation of the CNR with respect to the erasure repetition occurrence number by a two beam head when the erasing head 102 constructed as described above is used to perform erasure on a coordinate system wherein the axis of abscissa indicates the occurrence number and the axis of ordinate indicates the CNR. As apparently seen from FIG. 11, saturation erasure was achieved by a single erasing operation.

Now, the second embodiment of the present invention for achieving high density recording of an optical disk is described.

It has been reported by M. Okada et al. that the phase difference between light which has passed through an amorphous condition portion of a phase change medium and light which has passed through a crystal condition portion of the phase change medium relies upon the thickness of the first protective film (TECHNICAL REPORT OF IEICE, MR93-53, CPM93-15, 1993-12).

Figure 12:
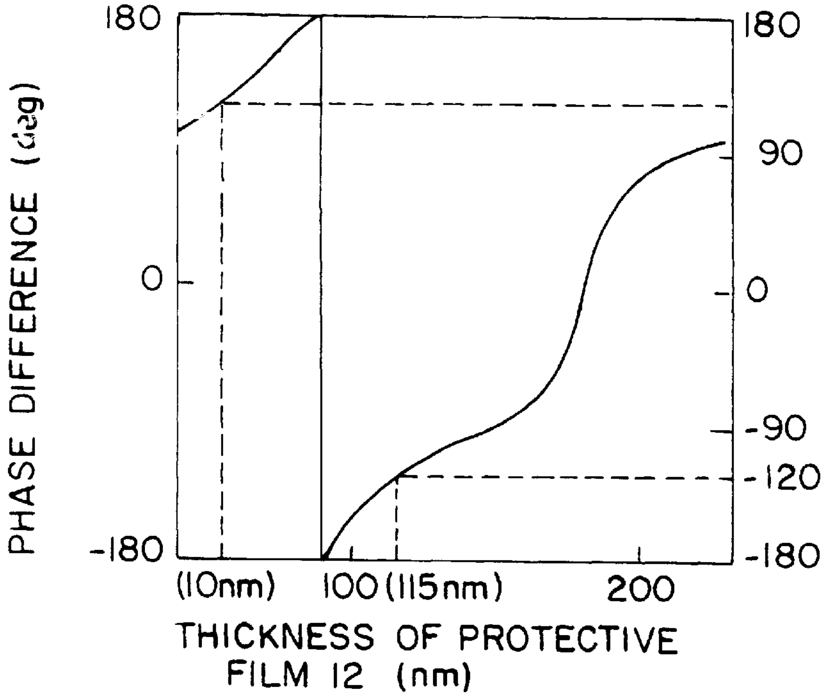
FIG. 12 is a graph illustrating a relationship between a first protective film 12 and the phase difference.

From FIG. 12, it can be seen that, from the relationship between the phase difference and the thickness of the protective film 12, in order to obtain a phase difference of, for example, 120 degrees, the thickness of the first protective film 12 should be 10 nm or 115 nm. Since the first protective film can be produced readily where the thickness thereof is not 10 nm but 115 nm, it is recommended in this instance to adopt the thickness of 115 nm.

Figure 13:
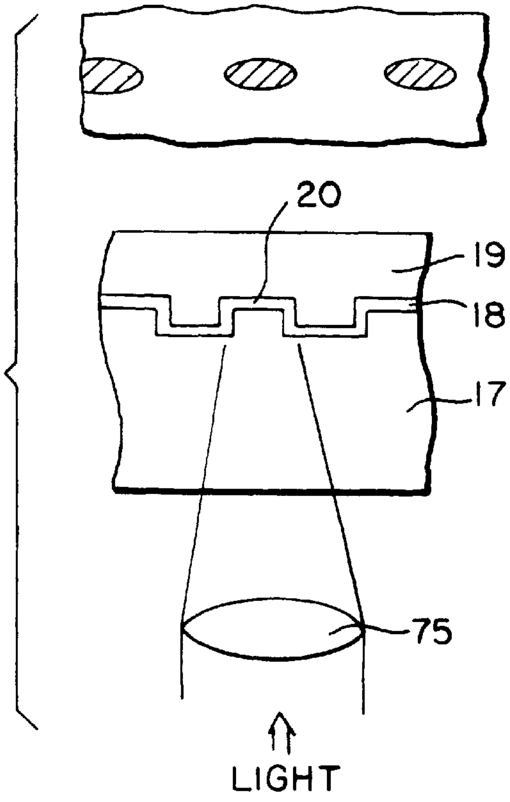
FIG. 13 is a partial sectional view of a phase difference optical disk of the pit type.

Making the phase difference of reflected light smaller than 180 degrees can be applied also to a phase difference optical disk of the pit type which does not allow rewriting of a record thereon. A phase difference optical disk of the pit type includes, as shown in FIG. 13, a disk base plate 17 of polycarbonate having concave or convex pits 20 provided on the surface thereof so as to represent marks of information, a reflection film 18 coated on the disk base plate 17 and a protective film 19 covering over the reflection film 18. It is known that the phase difference produced in reflected light of the optical disk relies upon the height of the pits and the wavelength $\lambda$ of the light. For example, where the height of the pits is 0.105 $\mu$m and the refractive index of the disk is 1.5, if the wavelength $\lambda$ of the laser light is 0.6328 $\mu$m, then the phase difference is 180 degrees, but if the wavelength $\lambda$ of the laser light is 0.78 gm, then the phase difference is 145 degrees.

As described above, whether the phase difference optical disk is of the phase change medium type or of the pit type, it can produce an arbitrary phase difference in reflected light from the optical disk to an optical head.

Figure 14:
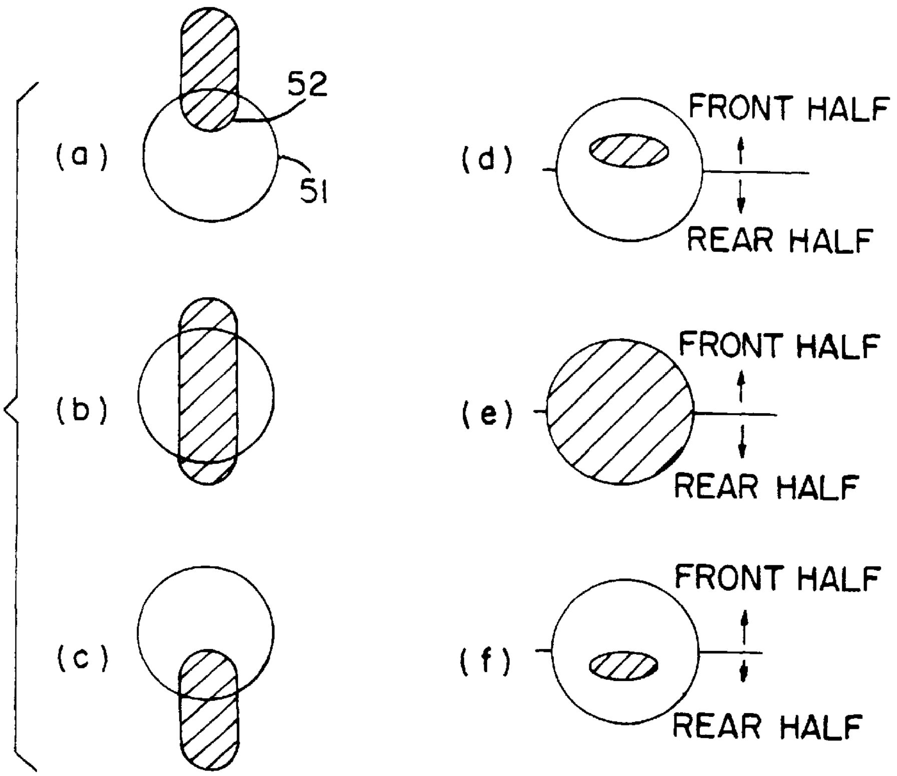
FIG. 14 is a diagrammatic view illustrating a variation of a diffraction image when the phase difference is smaller than 180 degrees.

When the phase difference of reflected light is smaller than 180 degrees, particularly where the phase difference ranges from 120 degrees to 150 degrees, the positional relationship between a light beam spot and a pit of a mark on the surface of a medium and a diffraction image on the aperture of an objective lens or on the right receiving surface of a light reception sensor are such as shown in FIG. 14. In particular, when a leading end of a mark 52 advances into a light beam spot 51 as shown in (a), the diffraction image of the mark 52 is projected on the light reception surface of the front half side of the objective lens as seen in FIG. 14(*d*). Then, when a trailing end of the mark 52 remains in the light beam spot 51 as seen in (c), the diffraction image is projected on the light receiving surface of the rear half side of the objective lens as seen in (f). This signifies that, when two marks successively advance into the light beam spot 51, they can be distinguished from each other.

Accordingly, the outputs of the light reception sensor exhibit a difference in time between the front half side and the rear half side. Therefore, by delaying the output of the front half side by means of the delay unit 80, the difference in time can be eliminated and successive marks can be distinguished from each other definitely. In short, by optimizing the phase difference in reflected light from a phase difference medium, the distance between marks can be minimized, and high density recording can be achieved.

Figure 15:
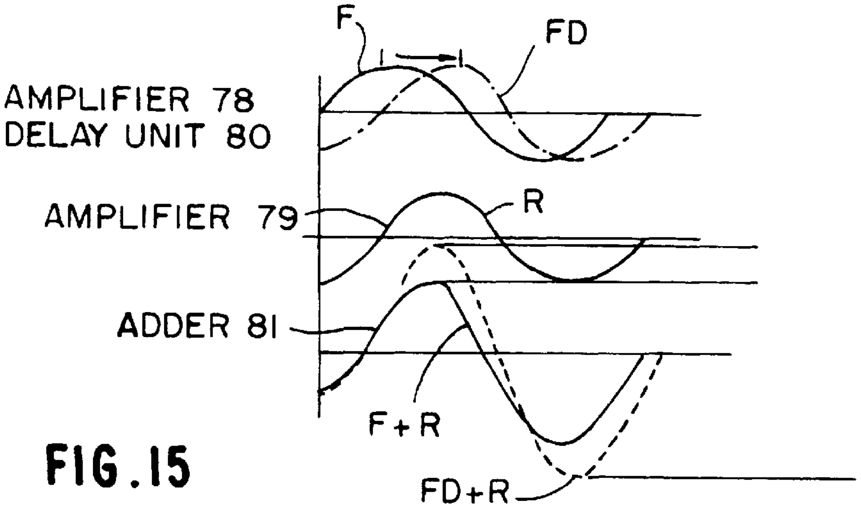
FIG. 15 is a waveform diagram showing output waveforms for amplifiers 78 and 79 when the phase difference is smaller than 180 degrees.

Referring to FIG. 15, the outputs of amplifiers 78 and 79 are indicated by solid lines F and R, respectively, and the output of the delay unit 80 is indicated by a broken line FD while the output of the adder 81 is indicated by a broken line FD+R. Further, when no delay unit is employed, the output of the adder 81 exhibits such a variation as indicated by another broken line F+R, and this exhibits some deterioration in rising edge of a transient response. The delay unit 80 is required to prevent the deterioration.

It is to be understood that variations and modifications of the record rewritable optical disk apparatus disclosed herein will be evident to those skilled in the art. It is intended that all such modifications and variations be included within the scope of the appended claims.

What is claimed is:

1. A data erasing method for a phase difference apparatus which includes a recording head, a reproducing head and an erasing head from which laser beams are irradiated upon an optical disk of a phase change medium to record, reproduce and erase data onto and from the optical disk, comprising the steps of:

producing two beams for erasure of data using said erasing head; and simultaneously irradiating the two beams in a neighboring relationship to each other on a track of the same circumference of the optical disk.

2. An optical disk apparatus for storage and reproduction of data on a phase chance optical disk and comprising a recording head, a reproducing head and an erasing head radially aligned with respect to a track of the same circumference along a direction of rotation of the optical disk, said optical disk apparatus further comprising:

means for producing two beams for erasure of data using said erasing head; and means for simultaneously irradiating the produced two beams in a neighboring relationship to each other on the same track in a focused condition on the optical disk.

3. An optical disk apparatus as claimed in claim 2, wherein said means for producing two beams for erasure of data includes two beam laser production means.

4. An optical disk apparatus as claimed in claim 2, wherein said means for producing two beams for erasure of data includes one beam laser production means, and a Wollaston polarizing prism for dividing a beam outputted from said one beam laser production means into two beams.

5. An optical disk apparatus as claimed in claim 2, wherein said means for producing two beams for erasure of data includes one beam laser production means, and a Bragg diffraction grating for dividing a beam outputted from said one beam laser production means into two beams.

6. An optical disk apparatus as claimed in claim 2, wherein said means for producing two beams for erasure of data includes one beam laser production means, and a Foucault prism for dividing a beam outputted from said one beam laser production means into two beams.

7. A data erasing method as claimed in claim 1, wherein said step of producing two beams comprises:

providing two sources of laser beams to produce the two beams for erasure of data.

8. A data erasing method as claimed in claim 1, wherein said step of producing two beams comprises:

providing one source of laser beam to produce one beam; and providing a Wollaston polarizing prism to divide said one beam into two beams for erasure of data.

9. A data erasing method as claimed in claim 1, wherein said step of producing two beams comprises:

providing one source of laser beam to produce one beam; and providing a Bragg diffraction grating to divide said one beam into two beams for erasure of data.

10. A data erasing method as claimed in claim 1, wherein said step of producing two beams comprises:

providing one source of laser beam to produce one beam; and providing a Foucault prism to divide said one beam into two beams for erasure of data.

* * * * *

UNITED STATES PATENT AND TRADEMARK OFFICE

CERTIFICATE OF CORRECTION

PATENT NO. : 6,157,596
DATED : December 5, 2000
INVENTOR(S) : Matsui, Tsutomu

It is certified that error appears in the above-identified patent and that said Letters Patent is hereby corrected as shown below:

Column 7,
Line 34, delete "gm" insert -- μm --

Column 8,
Line 26, delete "chance" insert -- change --

Signed and Sealed this

Twenty-third Day of October, 2001

*Attest:*

Nicholas P. Godici

NICHOLAS P. GODICI

*Attesting Officer*

*Acting Director of the United States Patent and Trademark Office*